Figures 1, 2:
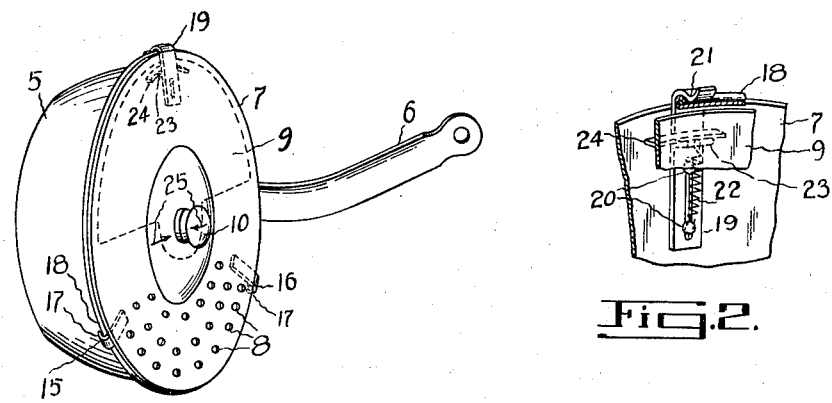

May 24, 1938.　　　　G. J. SMITH　　　　2,118,530

COOKING UTENSIL

Filed March 20, 1937

Inventor
George Joseph Smith
By Frederick C. Bromley
ATTY

Patented May 24, 1938

2,118,530

UNITED STATES PATENT OFFICE 2,118,530

COOKING UTENSIL

George Joseph Smith, Toronto, Ontario, Canada

Application March 20, 1937, Serial No. 131,981

1 Claim. (Cl. 53—8)

The invention relates to improvements in cooking utensils as described in the present specification and shown in the accompanying drawing that forms part of the same.

The aim of the invention is to provide a sauce-pan with a cover adapted to serve as a strainer for pouring off liquid and having means by which it may be retained on the sauce-pan without exposing the hands of the user to vapor emanating from the heated liquid.

In pouring off the liquid following the cooking of vegetables, the cover is usually used to retain the solid contents in the sauce-pan. In manually holding the cover on the pan for this purpose, the hand is exposed directly to the heat and scalds frequently result.

The present invention produces a practical and serviceable sauce-pan in which the hazard of scalding the hands is obviated.

Referring to the accompanying drawing, Figure 1 is a perspective view of the invention.

Figure 2 is a perspective detail thereof.

In the drawing, the reference numeral 5 generally denotes the sauce-pan and 6 the customary handle with which it is supplied. The cover is denoted at 7.

In carrying out the invention, the cover is supplied with a series of holes 8 at one side of its diameter; these local perforations form a strainer section by which liquid may be poured off without spilling of the solid contents. The underside of the cover is supplied with an imperforate plate 9 of such shape as to cover or close the holes aforesaid. The plate is rigidly attached to a top knob 10 and rotatably carried by the cover so that by turning the knob the plate may be swung about a central axis to open or uncover the holes.

This plate or closure is turned to close the strainer section in the cooking of vegetables and turned to uncover the strainer section for the pouring operation as will be well understood.

The means for retaining the cover on the sauce-pan comprise a pair of spaced clips 15 and 16 rigidly carried by the cover and having inwardly curved ends 17 adapted to fit over the bead 18 of the top of the sauce-pan. The clips are spaced on one side of the diameter of the cover, and a spring clip 19 is located on the other side of the diameter thereof. The spring clip is radially slidable such as by means of headed studs 20 engaged by a lengthwise slot in the clip, which has an inwardly curved outer end 21 adapted to clip onto the beaded edge aforesaid.

A spring 22 may be resorted to for the purpose of resiliently retaining the clip in its innermost position so as to cause it to hug the rim 18 when pressed thereon. In Figure 2, the tension coil spring 22 is shown attached at one end to the clip and connected at its other end to one of the studs 20 in order to exert a radially inward pull on the clip, the tension of which need only be light.

With a view to positively locking the cover on the sauce-pan while pouring fluid therefrom, the invention provides means whereby the plate, in its open position shown in Figure 1, secures the spring clip against release movement. For this purpose, the spring clip is supplied with a depending flange or projection 23 that is confronted by a ridge 24 in the open position of the plate. The ridge is rigid with the plate and extends transversely in front of the flange and thus obstructs its outward radial movement with the clip of which it forms a part.

To release the locking agents 23 and 24 it is merely necessary to turn the knob sufficiently to swing the ridge to one side or the other of the flange of the spring clip. The cover can then be sprung off the sauce-pan. Since the position of the rotatable plate cannot be seen when the cover is on the sauce-pan, indicators, such as the arrows 25, may be applied to the knob and to the top side of the cover in order to denote the locking position of the plate.

What I claim is:

In a cooking utensil, a sauce-pan having a beaded rim, a cover having a perforated section forming a strainer portion, a plate carried by the cover and centrally pivoted thereto for parallel rotary movement for closing and uncovering the perforated section, a knob for turning said plate, a pair of spaced clips rigidly carried by the cover at one side of its diameter and bent to hook onto the bead of the rim, a clip slidable radially on the other side of the diameter thereof and bent to hook onto the bead of the rim, a spring retracting the slidable clip, a projection carried by the slidable clip, and a ridge carried by the plate and adapted to engage the projection in one position of the plate to lock the spring clip in its engaged position so as to positively secure the cover on the sauce-pan.

GEORGE JOS. SMITH.